C. W. DAVIS.
JUNCTION BOX.
APPLICATION FILED OCT. 15, 1908.
916,537.
Patented Mar. 30, 1909.
2 SHEETS—SHEET 1.
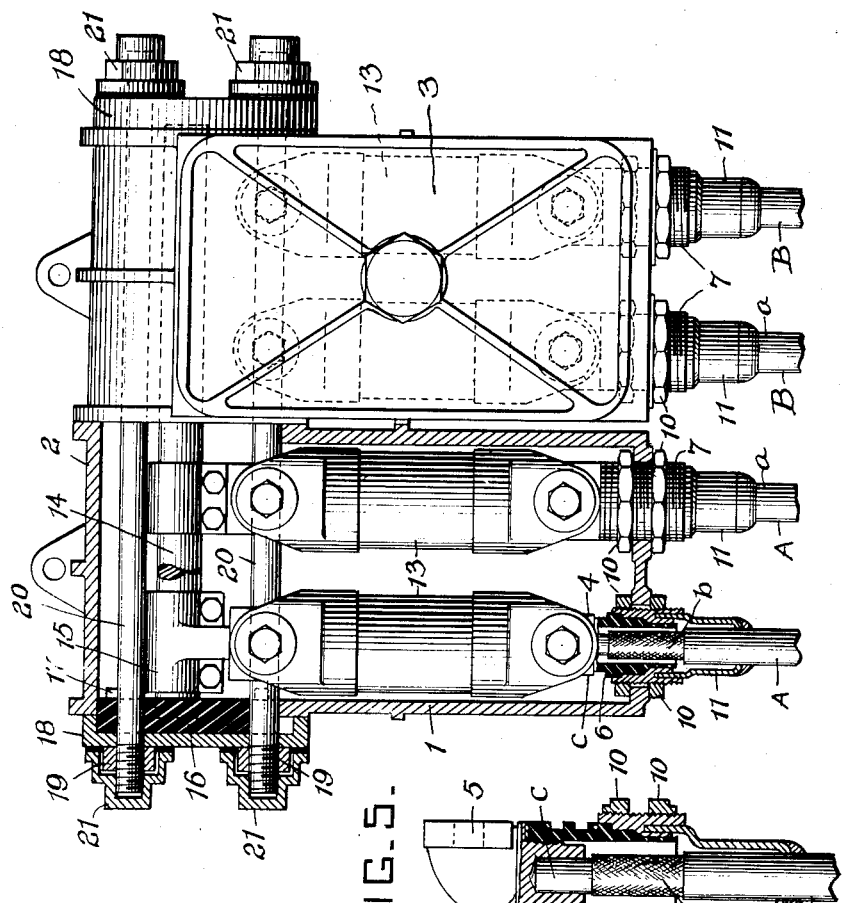
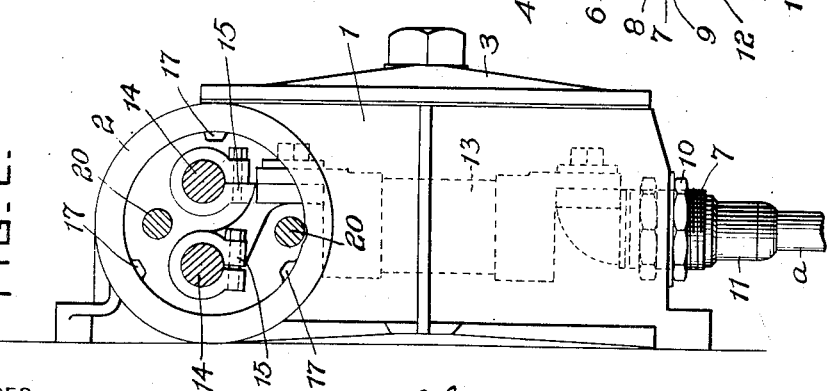
WITNESSES:
J. Herbert Bradley
Francis J. Tomasson
INVENTOR
Charles W. Davis
by Christy and Christy
Att'y's C. W. DAVIS.
JUNCTION BOX.
APPLICATION FILED OCT. 15, 1908.
916,537.
Patented Mar. 30, 1909.
2 SHEETS—SHEET 2.
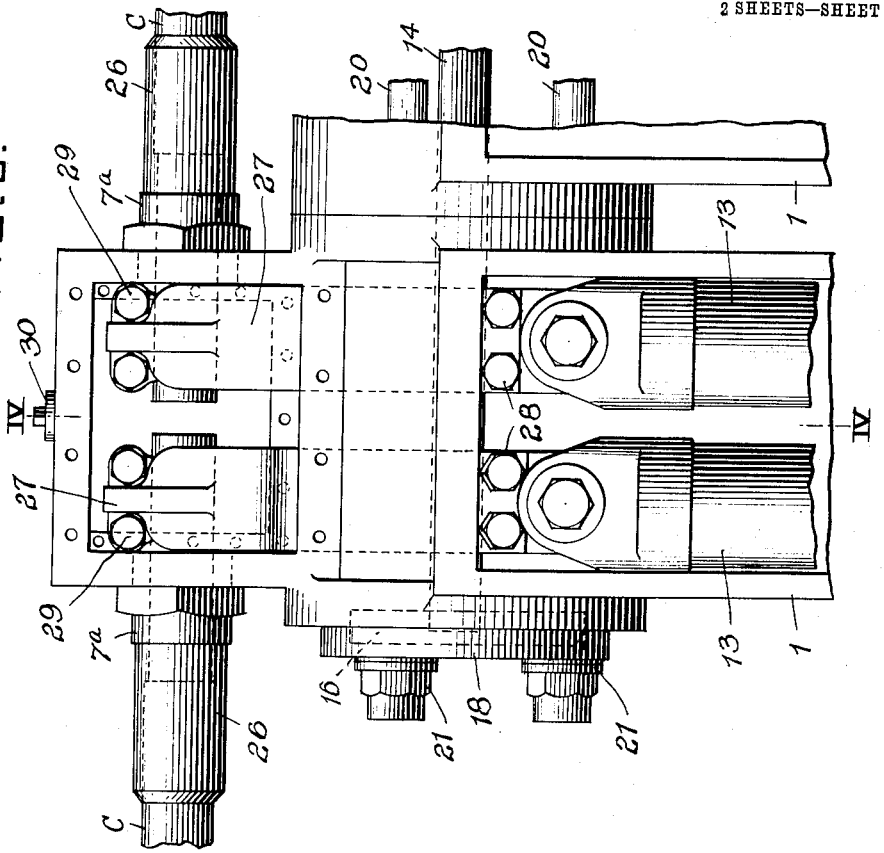
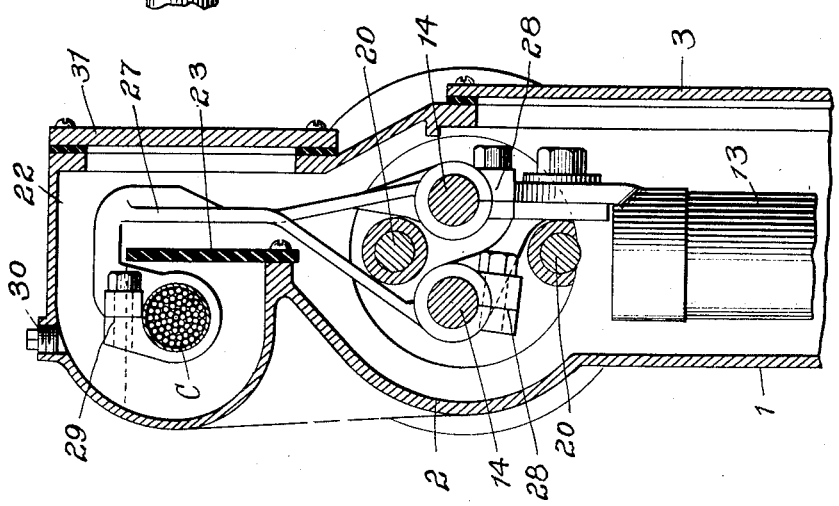
WITNESSES:
J. Herbert Bradley
Francis J. Tomasson
INVENTOR
Charles W Davis
by Christy and Christy
Atty's

UNITED STATES PATENT OFFICE.

CHARLES W. DAVIS, OF EDGEWORTH, PENNSYLVANIA.

JUNCTION-BOX.

No. 916,537.    Specification of Letters Patent.    Patented March 30, 1909.

Application filed October 15, 1908. Serial No. 457,932.

*To all whom it may concern:*

Be it known that I, CHARLES W. DAVIS, residing at Edgeworth, in the county of Allegheny and State of Pennsylvania, a citizen of the United States, have invented or discovered a certain new and useful Improvement in Junction-Boxes, of which improvement the following is a specification.

The invention described herein relates to certain improvements in junction boxes for manholes, and has for its object a construction permitting of the addition from time to time of additional members or elements as required by service without disturbing the elements or members and cable connections originally installed.

The invention is hereinafter more fully described and claimed.

In the accompanying drawings forming a part of this specification Figure 1 shows partly in front elevation and partly in section two members or elements of my improved junction box; Fig. 2 is a side elevation of a box or member, the cap or end plate being removed; Fig. 3 is a front elevation of the upper portion of a junction box showing an addition whereby cables at an angle to each other may be connected; Fig. 4 is a sectional elevation on a plane indicated by the line IV—IV Fig. 3; and Fig. 5 is a sectional detail on an enlarged scale showing the preferred manner of connecting the cable to the junction box.

My improved junction box consists of a main shell or case 1 preferably rectangular in shape, and a top portion 2 in which connection is made between the cables such top portion being preferably circular drum-like in shape.

The front wall 3 or a portion thereof is made removable to permit access to the interior of the box for making the several connections as hereinafter described. The drum portion 2 is also open at one or both of its ends but provision is made for closing these ends as hereinafter described. Openings are made in the lower end of the box for the insertion of the ends of cables, as shown in Fig. 1. The sheaths of the cables may be attached to the shell or case 1 in any convenient manner but preferably by the means sown in Figs. 1 and 5 the sheath *a* is removed for a suitable distance and also the insulation leaving a portion of the conductor bare. A metallic socket 4 provided with a lip 5 is fitted over the bared end of the conductor *c* and preferably sweated thereto. Before attaching the socket to the conductor a sleeve 6 of insulating material and a supporting sleeve 7 formed of metal are slipped onto the cable. The sleeve 6 is made of sufficient length to extend down and cover a portion at least of the insulation *b* from which the sheath has been removed, and is provided with a shoulder 8 adapted to rest on an internal shoulder 9 of the supporting sleeve 7. This sleeve 7 is externally threaded for the reception of the clamping nuts 10 whereby the sleeve is securely held in position relative to the case or shell. In order to connect the supporting sleeve to the cable one end of a lead thimble 11 is sweated into a groove formed in the sleeve 7 and the outer end of the thimble is contracted and attached by a wiped solder joint to the sheath of the cable. It is preferred that the outer wall of the groove in the sleeve 7 should be extended so as to overlap the thimble as shown at 12 in Figs. 1 and 5. It will be observed that by means of the nuts the sleeve 7 supporting the cable can be adjusted with reference to the bus bars to which the cable conductor is connected by fuses, the latter being usually of standard lengths.

After the cable has been connected to the case or shell, the conductor *c* is connected by a fuse 13 of any suitable construction to a bus-bar 14. In the construction shown one end of the fuse is bolted to the lip 5 on the socket 4 which as stated is electrically attached to the conductor *c* and the opposite end of the fuse is bolted to a metallic clip 15 provided with a slip sleeve adapted to be tightly clamped around the bus-bar.

The feeder cable A extends into one box and the distributing cables B into a similar adjoining box, one of the feeder and one of the distributing cables being connected to one bus-bar, and the other cables to the other bus-bar. As shown in Figs. 1 and 2 these bus-bars are arranged within the drum portion 2 of the junction box and extend from one unit of the box into the next or as many units as are employed. The bus-bar may be supported within the portion 2 in any suitable manner. As for example the ends of the bus-bars project into seats formed in disks 16 of insulating material, preferably porcelain, said disks fitting into the open ends of the portion 2 of the box and bearing against suitable stops 17. The disks are held in place by caps 18 closing the ends of the portions 2 and held in place by nuts 19 screwing onto rods 20 which may extend through the entire series of units forming the junction box. These rods serve to hold the caps in place and also to bind the several units together. The ends of the portions 2 are so finished that a tight joint will be formed between adjoining members and the caps will tightly seat when the parts are drawn together by the nuts 19 and 20. Additional protection is afforded by screwing cap nuts 21 on the projecting ends of the rods 20 said cap nuts surrounding the clamping nuts 19 as shown in Fig. 1.

It will be readily understood that additional cables, either feeder or distributing, may be inserted by removing the cap at one end of the series, loosening the clips 15 and drawing out the rods 20, and bus-bars 14. One or more units of the box are then placed alongside of those already in position, and longer bus-bars and clamping rods or bars and rods having sections added thereto, passed through the portions 2 of the original and added units, the bus-bars passing through the clips. The additional cables are connected up in the manner described, into the added boxes, the caps placed in position and the units and caps clamped together by tightening up the nuts 19.

In Figs. 3 and 4 is shown a construction whereby feeder and distributing cables may be connected in one unit or additional feeder or distributing cables may be added to the system. An extension 22 is formed on the portion 2 of a unit or single box, and a trough is formed in this extension by a partition 23 preferably detachably secured in position and preferably formed of insulating material. Openings are formed in the end walls of the trough for the insertion of the bared conductor of the cable C. The opening in the end walls of the trough are threaded for the reception of the threaded sleeve 7ª. One end of the thimble 26 is secured to this sleeve as shown in Fig. 5, and the opposite end of the thimble is contracted and secured by a wiped solder joint to the sheath of the cable C. The bared ends of the conductors are connected to the bus-bars by means of double slips 27, so constructed that one end may be secured as described to a fuse 13 having two split sleeve portions 28 and 29, one adapted to grip the bus-bars, and the other to be clamped onto the conductor of cable C. After the clips have been applied, insulating material is poured into the trough through the nozzle 30 to completely cover and insulate all of the cable within the trough, a portion of such insulating material flowing into the thimble 26. An opening is formed in the front wall of the extension 22 to permit access to the interior to form the connections. After all connections have been formed this opening is closed by a plate 31 and the front wall 3 is secured in position.

I claim herein as my invention:

1. A junction box consisting of a body portion having an opening at one end for the admission of a cable, a portion provided with a trough having openings in its end walls, and a portion having open ends intermediate of the body and trough portions.

2. A junction box consisting of a series of units, each unit consisting of a body portion having openings in its lower end, an open end portion above the body, said units being so arranged that a passage is formed by the upper portions continuous through the series in combination with bus-bars extending through such continuous passage and supports for the bus bars.

3. A junction box consisting of a series of units, each unit consisting of a body portion having openings at one end and an open ended portion at the opposite end of the body, said units being so arranged that a passage is formed by the open ended portions of the several units continuous through the series in combination with bus-bars extending through such passage, insulated supports for the bus-bars, caps for closing the ends of the continuous passage, and bolts extending through the passage, and nuts for binding the units together and holding the caps in position.

4. A junction box consisting of a series of units, each unit consisting of a body portion having openings in its lower end, and an open ended portion above such body, said units being so arranged that a passage is formed by the upper portions continuous through the series, one of the units having an extension provided with a trough having openings in its end walls, in combination with bus-bars extending through the passage, an insulating support for the bus-bars, and means for holding the units in operative relation to each other.

5. A junction box having a portion for the reception of bus-bars, and a trough shaped portion connected to the other portion and having openings at its ends for the insertion of the ends of cables, in combination with means for supporting the bus-bars, and means for connecting the conductors of the cables to the bus-bars.

6. A junction box having a portion for the reception of bus-bars, means for supporting said bars in said portion, sleeves adapted to be connected to a cable, and means for adjusting the sleeves relative to the bus-bars.

In testimony whereof, I have hereunto set my hand.

CHARLES W. DAVIS.

Witnesses:
CHARLES BARNETT,
FRANCIS J. TOMASSON.